US006238794B1

(12) United States Patent
Beesley et al.

(10) Patent No.: US 6,238,794 B1
(45) Date of Patent: May 29, 2001

(54) FADE RESISTANT BLACK COATING FOR ROOFING GRANULES

(75) Inventors: Arthur H. Beesley, Woodbury; Christine A. Sobon, Roseville, both of MN (US); Bill L. George, Hudson, WI (US); Nancy A. Waletzko, Zimmerman, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/242,115

(22) PCT Filed: Sep. 3, 1998

(86) PCT No.: PCT/US98/18327

§ 371 Date: Feb. 10, 1999

§ 102(e) Date: Feb. 10, 1999

(87) PCT Pub. No.: WO00/14164

PCT Pub. Date: Mar. 16, 2000

(51) Int. Cl.[7] ................. B32B 5/16; B05D 7/00
(52) U.S. Cl. ............. 428/403; 427/218; 427/219; 427/444; 428/404
(58) Field of Search ................. 428/330, 403, 428/404; 427/212, 215, 218, 219, 444

(56) References Cited

U.S. PATENT DOCUMENTS

| 2,439,442 | 4/1948 | Amon et al. ............... 23/209.1 |
| 2,981,636 | 4/1961 | Lodge et al. ............... 117/70 |
| 3,023,118 | 2/1962 | Donnet ............... 106/307 |
| 3,663,350 | * 5/1972 | Stokes ............... 161/151 |
| 4,032,491 | * 6/1977 | Schoenke ............... 260/28.5 |
| 4,589,804 | * 5/1986 | Paeglis et al. ............... 405/270 |
| 5,053,279 | * 10/1991 | Daniels et al. ............... 428/405 |
| 5,286,544 | 2/1994 | Graham ............... 428/144 |
| 5,368,936 | 11/1994 | Braunschweig et al. ............... 428/403 |
| 5,411,803 | 5/1995 | George et al. ............... 428/403 |
| 5,622,557 | * 4/1997 | Mahmud et al. ............... 106/712 |
| 5,814,143 | * 9/1998 | Freeman et al. ............... 106/450 |
| 5,863,323 | 1/1999 | Mahmud et al. ............... 106/712 |

FOREIGN PATENT DOCUMENTS

| 1234071 | 6/1971 | (GB) . |
| 96 02595 | 2/1996 | (WO) . |

OTHER PUBLICATIONS

Article entitled "Outdoor Exposure of Carbofin in Concrete", Part 1, by Dr. A.E. Jungk, G. Kurz, and Walluf, vol. 51, pp. 523–529, 1985.
Article entitled "Outdoor Exposure of Carbofin in Contrete", Part 2, by Dr A.E. Jungk, G. Kurz, and Walluf, vol. 51, pp. 623–628, 1985.
Article entitled "The Weather Stability of Black Pigments in Cement–Bound, Building Materials", Part 1, by Dr. Peter Kresse, Krefeld, vol. 51, pp. 534–539, 1985.
Article entitled "The Weather Stability of Black Pigments in Cement–Bound, Building Materials", Part 2, by Dr. Peter Kresse, Drefeld, vol. 51, pp. 618–622, 1985.
Technical Bulletin entitled "Carbocolor Concrete Colorant", Bulletin #004, by Cleveland Pigment & Color Co., Mar., 1997.

* cited by examiner

Primary Examiner—H. Thi Le
(74) Attorney, Agent, or Firm—Brian E. Szymanski

(57) ABSTRACT

A composition, containing carbon black pigment particles of a specific size and an inorganic binder, suitable for use as a color coating on inorganic substrates to provide a greater resistance to fade than conventional coating compositions. The particles have a mean particle size in the range of about 150 nm to about 500 nm and a surface area per weight of particles of about 20 $m^2/g$ or less. The composition is useful in producing coated inorganic granules for specific uses, such as roofing granules.

19 Claims, No Drawings

FADE RESISTANT BLACK COATING FOR ROOFING GRANULES

FIELD OF THE INVENTION

The present invention relates to a coating for inorganic substrates, particularly to a coating composition containing carbon black pigment particles, and even more particularly to inorganic granules (e.g. roofing granules) coated with such a composition.

BACKGROUND

Inorganic substrates have been coated with compositions that contain pigments to impart color properties to the substrate for aesthetic purposes. The coated substrates are generally applied or affixed to specific carriers to provide a desired color to the object. For example, coated inorganic granules are often utilized on roofing shingles.

Composite roofing shingles usually employ a web of fibrous base material. The base material typically is a nonwoven fabric such as felt, fiberglass, or similar materials, which are impregnated with a bituminous composition such as asphalt. A layer of bituminous material typically is also applied onto one side of the base material. Roofing granules are then pressed into the layer of bituminous material while it is in a warm, softened condition. Upon cooling, the roofing granules remain attached as a surface layer. The layer of roofing granules functions as a protective layer to shield the bituminous material and the base material from both solar (e.g. ultraviolet radiation) and environmental degradation. Additionally, the roofing granules are generally colored to provide an aesthetically pleasing appearance to the building or structure upon which the shingles are applied.

The coloring of the shingles is an important feature which renders a desired appearance to a structure. It is preferred that the color of the shingles resist fading and maintain the original color over time. Certain colors have had a greater tendency to fade thus yielding an undesirable effect in the color of the granular coated shingle. Black colors, specifically medium blacks, have a greater tendency to fade when exposed to weathering conditions, such as temperature cycles and acidic precipitation. Medium blacks, as defined with CIELAB color scale coordinates, generally have an L* value within the range of about 24 to 37. Black colored roofing granules are often blended with one or more colored granules of a different hue to provide a specific color blend. This blend, when viewed from a distance, appears as a uniform color. Any resulting color change due to fading can adversely affect the desired color of the shingle.

Inorganic granules having a black color are produced by coating an inorganic granular material with a slurry containing an inorganic binder and black pigment particles. The pigments are generally carbon black particles with a mean particle size of less than 110 nm. The inorganic granular material is heated in a rotary kiln and mixed with the slurry of inorganic binder and pigment particles. The coated inorganic granules are first dried and then fired at temperatures in excess of 170° C. to insolubilize the binder. While each of the resulting coated granules exhibit a desirable black color, the color has a tendency to fade over time when exposed to weathering conditions.

Thus, it would be an advantage to provide a coating composition that is capable of imparting a fade resistant black color to an inorganic granular substrate.

SUMMARY OF THE INVENTION

The present invention provides a novel coating composition which exhibits a greater resistance to fade from environmental conditions. The composition includes an inorganic binder and carbon black pigment particles having specific size parameters. Additionally, the present invention discloses coated inorganic substrates, a roofing shingle utilizing the coated substrates, and a method for producing the coated substrates.

The present invention is a composition suitable for coating an inorganic substrate. The composition comprises an amount of an inorganic binder that is sufficient to bind the composition to a substrate. A plurality of carbon black pigment particles are included in the composition. The particles have a mean particle size in the range of about 150 nm to about 500 nm. Additionally, the particles have a surface area per weight of particles in the range of about 20 $m^2/g$ or less. The carbon black particles impart a black appearance to the substrate granule after the composition has been applied and heated to form a coating on the granule. The black color of the coated granule exhibits a greater resistance to fade.

The present invention also includes coated granules having a black fade resistant coating. The granules are generally inorganic granules upon which the inventive coating composition is applied. The coated granules are ideally suited for such applications as roofing granules. When utilized as roofing granules, the coated granules of the present invention are generally pressed onto a carrier substrate. The carrier substrate is preferably a bituminous layer applied onto a base substrate of felt or fiberglass.

The coated granules of the present invention exhibit a greater resistance to environmentally induced fade than granules coated with smaller carbon black pigment particles. The resistance to fade is measured by subjecting the granular material to an accelerated weathering test. The test is utilized to indicate the extent of color change from the initial color of the coated granule. The color value is measured in accordance with CIELAB color scale coordinates. The change is color is reported as the difference in L* values. The coatings of the present invention exhibit a resistance to fade indicated by an L* value change of 5 or less.

Additionally, the present invention includes a method of coating the inorganic substrates. The method includes the application of the inventive coating composition onto an inorganic substrate. The composition covering the substrate is then heated to form a coating on the substrate. The coating exhibits a greater resistance to fade.

DETAILED DESCRIPTION OF THE PREFERRED EMBODIMENT

In accordance with the present invention, it has been discovered that a composition containing carbon black pigment particles of a specific size is suitable for use as a coating on inorganic substrates which provides a greater resistance to fade than conventional coating compositions. The present invention is particularly applicable to the use of this composition for coating inorganic granules, the method of making the coated granule, and the specific use of the coated granule in a roofing shingle.

The coating composition of the present invention is generally an aqueous slurry containing an inorganic binder and a plurality of carbon black pigment particles. The composition is heated at elevated temperatures to produce a ceramic-type coating on inorganic substrates. Thus, the composition must withstand temperatures of at least about 170° C., and preferably up to about 650° C., without exhibiting thermal degradation.

The function of the inorganic binder in the composition is to adhere the coating to a desired inorganic substrate.

Preferably, the inorganic binder is an alkali metal silicate binding agent. Alkali silicate binding agents include those selected from the group consisting of lithium silicate, potassium silicate, sodium silicate, or combinations thereof The alkali metal silicate is generally designated as $M_2O:SiO_2$, where M is lithium, potassium, or sodium. The weight ratio of $SiO_2$ to $M_2O$ ranges from about 1.4:1 to about 3.75:1. Preferably, the weight ratio in the range of about 2.75:1 to about 3.22:1. At about 38% to about 41% solids in solution, the amount of inorganic binder included in the coating composition is in the range of about 14 to about 30 parts by weight per thousand parts by weight of granules, and preferably in the range of about 17 to about 22 parts by weight per thousand parts by weight of granules.

Carbon black pigment particles are utilized in coatings to reduce the reflectance of visible light and thereby impart a darker color to the coating. Carbon black pigments are often preferred because of their economy and color strength. The particles may also be used to provide protection from ultraviolet radiation or to provide electrical conductivity. The carbon black particles are produced through various processes and may be referred to by the process in which they were made, such as lampblack, acetylene black, impingement black, channel black, furnace black, gas black, and thermal black. The noted black particles are generally classified under the Colour Index system as CI 77266 (CI pigment black 6 and 7). For purposes of the invention, the term carbon black pigment is utilized to indicate all of the black pigments classified as CI 77266. Characteristics utilized to distinguish the particles from one another include the mean particle size (primary particle size) and the surface area per weight of particles. The mean particle size is determined by electron microscopy under ASTM D3849. The surface area per weight of particles is determined through nitrogen absorption under ASTM D3037 or ASTM D4820.

A plurality of carbon black pigment particles having a mean particle size in the range of about 150 nm to about 500 nm and a surface area per weight of the particles of about 20 $m^2/g$ or less are included in the inventive composition. Carbon black pigment particles having the noted mean particle size together with the surface area per weight ratio specified, when applied in a coating to a granule, have been found to have a greater resistance to fade when compared to conventional smaller sized pigments. Preferably, the particles have a mean particle size within the range of 250 nm to 350 nm. It is also preferred that the surface area per weight of the particles is 15 $m^2/g$ or less, and most preferably 10 $m^2/g$ or less. The carbon black pigment particles are added to the slurry in an amount sufficient to achieve about 0.02 parts to about 11 parts by weight of pigment per 1000 parts by weight of granules. Preferably about 0.05 parts to about 3 parts by weight of pigment to 1000 parts by weight granules A preferred carbon black pigment particle is marketed as N990 from Engineered Carbons, Inc., Borger, TX, with a mean particle size of 320 nm and a nitrogen surface area of 8 $m^2/g$, or from Cancarb, Limited, Medicine Hat, Alberta, Canada, with a mean particle size of 256 nm and a nitrogen surface area of 9.4 $m^2/g$.

In accordance with the inventive composition, an aluminosilicate compound may optionally be added to the composition in order to neutralize the binder. Conventional aluminosilicate compounds are suitable for use with the present invention. The aluminosilicate compound is preferably a clay having the formula $Al_2Si_2O_5(OH)_4$. However, other aluminosilicate compounds, such as kaolin $(Al_2O_3.2Si_2O_2.2H_2O)$, may be utilized in practicing the present invention. The aluminosilicate compound is included in the composition in an amount sufficient to achieve a ratio of up to 15 parts by weight of aluminosilicate per 1000 parts by weight granules. Preferably, the ratio is 7 to 13 parts by weight of aluminosilicate per 1000 parts by weight granules. The particle size of the aluminosilicate compound may vary. However, it is generally preferred that the aluminosilicate contain less than 0.5 percent coarse particles (particles greater than 0.002 millimeters in diameter).

Alternatively, other pigments may be included in the composition and mixed with the carbon black pigment particles to achieve a desired color property. Suitable pigments would include compounds such as titanium oxide, chromium oxide, yellow iron oxide, phthalocyanine green and blue, ultramarine blue, red iron oxide, metal ferrites, and mixtures thereof For example, titanium oxide may be mixed with the carbon black particles of the present invention to achieve a gray colored coating. Those skilled in the art are capable of determining amounts of additional pigments needed in a composition to achieve a specific color property. The non-fading attribute of the carbon black coating of the present invention enhances the ability to achieve a specific color without concern for subsequent color changes due to weathering. The mean particle sizes of the noted pigments may vary. However, the noted pigments generally are not susceptible to fading in comparison to the conventional carbon black pigments.

Optionally, dispersants may be added to the composition to assist in dispersing the carbon black particles, and other optional pigment particles, throughout the composition. The appropriate level of dispersion of particles in the slurry will assist in achieving a coating on a granular substrate having a greater uniformity in color. Both anionic and non-ionic dispersants may be suitable for use with the present invention. The dispersant is typically used in an amount ranging up to about 20 weight percent of the pigment particles, and preferably up to about 10 weight percent of the pigment particles. An example of a dispersant is the sodium salt of sulfonated naphthalene-formaldehyde condensate marketed as Rhodacal N from Rhodia in Cranbury, N.J.

Other optional compounds include algicides, zinc oxides, and borates. These compounds are described in U.S. Pat. No. 5,411,803, which is herein incorporated by reference.

In preparing the composition for application to an inorganic substrate, the inorganic binder is first mixed with a portion of water. The amount of water may vary depending upon the type of binder utilized. With a sodium silicate binder, water is added to achieve a ratio of about 1 part water by weight to about 2 parts sodium silicate solution (38%–41% solids in solution) by weight. The amounts may vary depending upon the inorganic binder and other optional ingredients. The carbon black pigment particles are then added to the composition along with any of the other optional ingredients.

The composition of the present invention is applied onto an inorganic substrate. The inorganic substrate is generally a rock, mineral, or recycled material (e.g. slag) in granular form that is capable of receiving a coating. Suitable inorganic materials for the substrates include those selected from the group consisting of argillite, greenstone, granite, trap rock, silica sand, slate, nepheline syenite, greystone, crushed quartz, and slag. Preferably, the inorganic material is crushed to a particle size having a diameter in the range from about 300 micrometers to about 1600 micrometers.

The composition of the present invention is applied onto the inorganic substrate to form a coating on the outer surface of the substrate. For purposes of the invention, coating is used to describe one or more layers of coatings applied onto the substrate through the use of the present inventive composition. The process for coating the substrates is generally disclosed in U.S. Pat. No. 5,411,803, herein incorporated by reference. The inorganic granules are initially preheated in a rotary kiln, or equivalent means, to a temperature of about 65° C. to about 140° C. The coating composition is then applied to uniformly coat the granules. The rate of application for the composition to the granule may vary depending on the range of components within the composition. Those skilled in the art are capable of determining this proper rate based upon the ranges previously noted for all components. The heat of the granules drives off some of the water in the coating to achieve a moisture level of about 0.6% to about 1%. The coated substrates are then heated to temperatures necessary to provide insolubilization of the inorganic binder and thus form a ceramic coated inorganic granule. The insolubilization of the binder renders the binder sufficiently resistant to dissolution in water or bituminous material. The heating, or firing, of the coating composition takes place at temperatures in the range of about 170° C. to about 650° C. and preferably 200° C. to about 538° C.

Depending on the inorganic material and desired end use, the coated substrates may optionally be post-treated to improve the handling of the material or to enhance the adhesion of the coated substrate to other substrates. Typical treatments, though not the subject of the present invention, include hydrocarbon oils, silicones and inorganic chemical solutions, such as solutions of magnesium chloride, and the like. One useful silicone is known under the trade designation "Tegosivin HL15M7" an organosiloxane silicone oil, available from Goldschmidt Chemical, Hopewell, Va. Traditionally, slate oil, such as that available from Cross Oil & Refining Co. Inc., Smackover, Ark., has been utilized for dust control. The compounds are added to the coated substrates in an amount ranging from about 0.0025 to about 0.7 weight percent of the granule, depending on the material. Those skilled in the art are capable of determining the proper amount needed to achieve a desired result. The additives are generally applied during the cooling step of the coating process.

In accordance with the present invention, it may be necessary to employ a pickling step to either insolubilize the binder or to improve the adhesion of the coated granules to bituminous material for applications on roofing shingles. Pickling with an acidic solution is typically employed when the firing of the coated substrate occurs at temperatures less than 430° C. The pickling solution neutralizes unreacted silicate in the ceramic coating. Conventional pickling solutions generally recognized in the art are suitable for use with the present invention.

The resulting coated substrates of the present invention exhibit a durable coating containing the carbon black pigment particles. It is desirable to produce a coating having a black color as defined by CIELAB color scale coordinates of L* in the range of about 24 to about 37. The black color defined by the L* range is considered a medium black. Those skilled in the art recognize that the resulting color may be adjusted by selecting different pigments to include with the carbon black particles of the present invention.

The coated granules of the present invention exhibit a greater resistance to fade over time than coated granules produced with smaller carbon black particle sizes. The resistance to fade is measured by the accelerated weathering test. The test, described fully in the Examples, is utilized to determine the amount of color fade of the particles under oxidizing conditions. The color of the coated granules are measured prior to and after the test. The color is determined with respect to CIELAB color scale coordinates. The color change is reported as the difference in L* values between the initial and final readings. The coatings produced in accordance with the present invention generally have an L* change of 5 or less, and preferably 3 or less.

The coated granules of the present invention are ideally suited for use in various applications requiring non-fading color granules. For example, the coated granules are well suited for use as roofing granules. The coated granules may be applied to warm bituminous coated shingle base material of a felt or fiberglass. Additionally, the coated granules of the present invention may be used in various architectural products, such as, for example, polymeric flooring and swimming pool plaster.

The following non-limiting examples further illustrate the present invention. Unless otherwise indicated, the following test procedures were used in the examples. The particular materials and amounts recited in these examples, as well as other conditions and details, are to be interpreted broadly in the art and should not be construed to unduly restrict or limit the invention in any way.

EXAMPLES

Test Methods

Accelerated Weathering Test 50 grams of full grade granules and 100 ml of full strength chlorine bleach (Clorox 5.25% sodium hypochlorite, The Clorox Co. Oakland, Calif. 94612) are put in a 250 ml Erlenmeyer flask and capped with a rubber stopper. The flask is held in a 51.7° C. (125° F.) oven for 4 hours. The bleach is poured off and the granules are rinsed with warm tap water and twice with deionized water. The water is poured off and the granules, in the flask, are put in a 148.9° C. (300° F.) oven for 2 hours. The flask with the granules is removed from the oven and 150 ml of deionized water is added to the flask. The flask is capped with a rubber stopper and held in a 51.7° C. (125° F.) oven for 13 hours. The water is then poured off, the granules are rinsed twice with deionized water and the granules, in the flask, are dried in a 148.9° C. (300° F.) oven for 2½ hours. The granules are left to cool to room temperature for 2 hours, during which time the color is measured. The cycle is repeated for 5 days.

Color Measurement

The granule colors were determined using measurements in the 1976 CIE L*a*b* color space, as explained in Billmeyer, F. W. and Saltman, M., *Principles of Color Technology*, 2nd Ed., John Wiley & Sons (New York) pp. 62–64. Briefly, a sample of colored granules is placed in an instrument fitted with a defined light source and measuring geometry and the reflectance from the samples is measured in the visible spectrum from 400 to 700 nanometers wavelength. The reflectance values are converted, by the instrument, into three color scale coordinates: "L*", "a*" and "b*". "L*" is a measure of lightness-darkness, with lower values being darker. "a*" is a measure of red-green, and "b*" is a measure of yellow-blue. One instrument found useful for measuring L*, a* and b* values is the spectrocolorimeter known under the trade designation "Labscan 6000 Spectrocolorimeter" available from Hunter Associates Laboratory, Inc. Reston, Va.

Materials Description

The following materials are used in the examples which follow:

Sodium silicate solution (39.4% solids, 2.75 ratio $SiO_2$ to $Na_2O$), available from PQ Corporation, Valley Forge, Pa.

CB490 is carbon black known under the trade designation "Black Pearls 490" from Cabot Corp., Billerica, Mass., with a mean particle size of 25 nm and a nitrogen surface area of 87 m$^2$/g.

EC N660 is carbon black with ASTM D 1765 designation N660 from Engineered Carbons, Inc., Borger, Tex., with a mean particle size of 68 nm and a nitrogen surface area of 34 m$^2$/g.

EC N990 is carbon black with ASTM D 1765 designation N990 from Engineered Carbons, Inc., Borger, Tex., with a mean particle size of 320 nm and a nitrogen surface area of 8 m$^2$/g.

CC N990 is carbon black with ASTM D 1765 designation N990 from Cancarb, Limited, Medicine Hat, Alberta, Canada, with a mean particle size of 256 nm and a nitrogen surface area of 9.4 m$^2$/g.

R 410 is carbon black known under the trade designation "Raven 410" from Columbian Chemicals Company, Atlanta, Ga., with a mean particle size of 101 nm and a nitrogen surface area of 26 m$^2$/g.

"Rhodacal N" is the trade designation for the sodium salt of naphthalene formaldehyde sulfonate available from Rhodia, Cranbury, N.J.

Windsor clay is a kaolin clay, reactive with alkali metal silicate solutions, with a composition of about 44% $SiO_2$, 38.8% $Al_2O_3$, 1.2% $Fe_2O_3$, 1.46% $TiO_2$, and small amounts of CaO, MgO, $K_2O$ and $Na_2O$, available from Kentucky-Tennessee Clay Co., Mayfield, Ky.

Procedure for Coating Granules

The procedure used in the following examples for coating the granular materials of the invention and the comparative examples was as follows:

A slurry was formed by mixing 20 parts sodium silicate solution, 10 parts water, 0.06 parts Rhodacal N, 1.5 parts carbon black, 10 parts Windsor clay. The slurry was mixed with a laboratory scale mixer at room temperature for about 5 minutes until well mixed. 1000 parts of grade #11 greystone granules (−10/+35 US mesh size) (i.e. 1065 micrometers average particle size) were preheated to about 90 to 95° C. in an oven or with a hot air gun. The slurry (41.6 parts by weight) was then coated onto the preheated granules (1000 parts by weight) by mixing in a vertical change-can mixer for 4 minutes, with warm air applied for the last minute, using a hot air gun, to dry the coated granules. The coated granules were then fired in a laboratory rotary kiln, reaching a temperature of 480° C. in about 10 minutes. The granules were then air-cooled to room temperature.

Examples

For Example 1, a slurry was made using EC N990 as the carbon black. The granules were coated with the slurry and fired as described in the procedure for coating granules.

For Example 2, a slurry was made using CC N990 as the carbon black. The granules were coated with the slurry and fired as described in the procedure for coating granules.

For Comparative Example A, a slurry was made using EC N660 as the carbon black. The granules were coated with the slurry and fired as described in the procedure for coating granules.

For Comparative Example B, a slurry was made using CB 490 as the carbon black. The granules were coated with the slurry and fired as described in the procedure for coating granules.

For Comparative Example C, a slurry was made using R 410 as the carbon black. The granules were coated with the slurry and fired as described in the procedure for coating granules.

The granule color was measured, before and after the 5-day accelerated weathering test, and results of L* before the cycle test and change in L* from the cycle test were as follows:

|  | Ex. 1 | Ex. 2 | Ex. A | Ex. B | Ex. C |
| --- | --- | --- | --- | --- | --- |
| L* before | 29.43 | 28.69 | 21.37 | 19.83 | 22.83 |
| change in L* | −0.17 | −0.18 | +8.76 | +22.79 | +8.24 |

A positive change in L* indicates that the granules became lighter, or faded. A larger positive change in L* indicates a larger amount of fade. A smaller positive change in L* indicates resistance to fade.

Examples 1 and 2 indicate that the coating composition of the present invention exhibit little color change when subject to the accelerated weathering test. The color of Comparative Examples A, B, and C changed significantly when subjected to the same test. While the initial L* value of Examples A, B, and C was lower than the preferred range, the color change is at a level higher enough to indicate a propensity to fade. In order to bring the initial color of Examples A, B and C into the preferred L* ranges, it would be necessary to either add lighter pigments, such as $TiO_2$, or reduce the amount of carbon black pigments. The inclusion of lighter pigments would make the color change of the carbon black granules even more pronounced.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof

What is claimed is:

1. Roofing granules comprising:
   a plurality of coated roofing granules, each of said coated roofing granules including an inorganic granule and a coating applied onto an outer surface of said inorganic granule, said coating including an amount of an alkali metal silicate binder sufficient to bind said coating to said inorganic granule, and a plurality of carbon black pigment particles having a mean particle size in the range of about 150 nm to about 500 nm and a surface area per weight of said particles of about 20 m$^2$/g or less, said carbon black pigment particles imparting a black color to said coating which exhibits a greater resistance to fade.

2. Roofing granules as recited in claim 1, wherein the resistance to fade, as measured in accordance with the accelerated weathering test, has a CIELAB L* value change of 5 or less.

3. A method of producing a coated granule comprising:
   applying a granule coating composition onto an inorganic granule, said coating composition including an amount of an alkali metal silicate binder sufficient to bind the composition to said granule and a plurality of carbon black pigment particles having a mean particle size in the range of about 150 nm to about 500 nm and a surface area per weight of said particles of about 20 m$^2$/g or less; and
   heating said composition to a sufficient temperature to form a coating on said granule, said carbon black pigment particles imparting a black color to said coating which exhibits a greater resistance to fade.

4. The method as recited in claim 3, wherein the heating occurs at temperatures up to 650° C.

5. A plurality of coated granules, each coated granule comprising:
   an inorganic granule; and
   a coating applied onto an outer surface of said granule, said coating including an amount of an alkali metal silicate binder sufficient to bind said coating to said granule, and a plurality of carbon black pigment particles having a mean particle size in the range of about 150 nm to about 500 nm and a surface area per weight of said particles of about 20 $m^2/g$ or less, said carbon black pigment particles imparting a black color to said coating which exhibits a greater resistance to fade.

6. The coated granules as recited in claim 5, wherein the black appearance, as defined by CIELAB color scale coordinates, has an L* value in the range of about 24 to about 37.

7. The coated granules as recited in claim 5, wherein the resistance to fade, as measured in accordance with the accelerated weathering test, has a CIELAB L* value change of 5 or less.

8. The coated granules as recited in claim 5, wherein the surface area per weight of said carbon black pigment particles is about 15 $m^2/g$ or less.

9. The coated granules as recited in claim 5, wherein the mean particle size is in the range of about 250 nm to about 350 nm.

10. A composition suitable for coating an inorganic substrate, comprising:
    an amount of an inorganic binder sufficient to bind said composition to a substrate; and
    a plurality of carbon black pigment particles having a mean particle size in the range of about 150 nm to about 500 nm and a surface area per weight of said particles of about 20 $m^2/g$ or less, said carbon black pigment particles imparting a black color to said composition after having been applied and heated to form a coating on a substrate, the black color of the coating exhibiting a greater resistance to fade.

11. The composition as recited in claim 10, further comprising an aluminosilicate compound.

12. The composition as recited in claim 10, wherein said composition can withstand temperatures up to 650° C.

13. The composition as recited in claim 10, wherein the black appearance, as defined by CIELAB color scale coordinates, has an L* value in the range of about 24 to about 37.

14. The composition as recited in claim 10, wherein the resistance to fade, as measured in accordance with the accelerated weathering test, has a CIELAB L* value change of 5 or less.

15. The composition as recited in claim 10, wherein the resistance to fade, as measured in accordance with the accelerated weathering test, has a CIELAB L* value change of 3 or less.

16. The composition as recited in claim 10, wherein the mean particle size is in the range of about 250 nm to about 350 nm.

17. The composition as recited in claim 10, wherein the surface area per weight of said carbon black pigment particles is about 15 $m^2/g$ or less.

18. The composition as recited in claim 10, wherein said inorganic binder is an alkali metal silicate.

19. The composition as recited in claim 18, wherein said alkali metal silicate is selected from the group consisting of lithium silicate, potassium silicate, sodium silicate, or combinations thereof.

* * * * *